May 21, 1929.  G. HANSON  1,713,900
RODENT TRAP

Original Filed Dec. 22, 1925

INVENTOR
GUST HANSON
ATTORNEYS

Patented May 21, 1929.

1,713,900

UNITED STATES PATENT OFFICE.

GUST HANSON, OF VANCOUVER, BRITISH COLUMBIA, CANADA, ASSIGNOR OF ONE-HALF TO CHARLES JOHNSON, OF VANCOUVER, BRITISH COLUMBIA, CANADA.

RODENT TRAP.

Application filed December 22, 1925, Serial No. 77,045. Renewed October 22, 1928.

My invention relates to improvements in rodent traps the objects of which are to provide means whereby the rodent on approaching the bait in the trap is precipitated into a body of water below the trap, a further object is to provide that a certain portion of the trap floor shall be traversed before the releasing means for the floor is operated, and that the passage through which the rodent passes is closed behind him temporarily to prevent his return.

The invention consist essentially of a platform supporting a bait box and a pair of runways which are adapted to tilt in opposite directions to permit the rodent to fall between them, and means for holding the first of the two runways in inoperative position until the front paws of the rodent are placed upon the second runway, as will be more fully described in the following specification, in which:—

In the drawings like characters of reference indicate corresponding parts in each figure.

Figure 1:
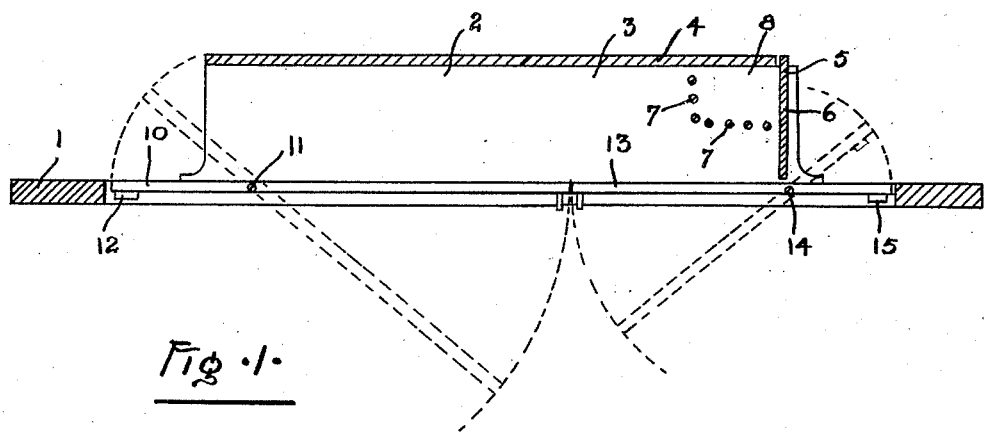
Fig. 1 is a longitudinal sectional view of the invention.
Figure 2:
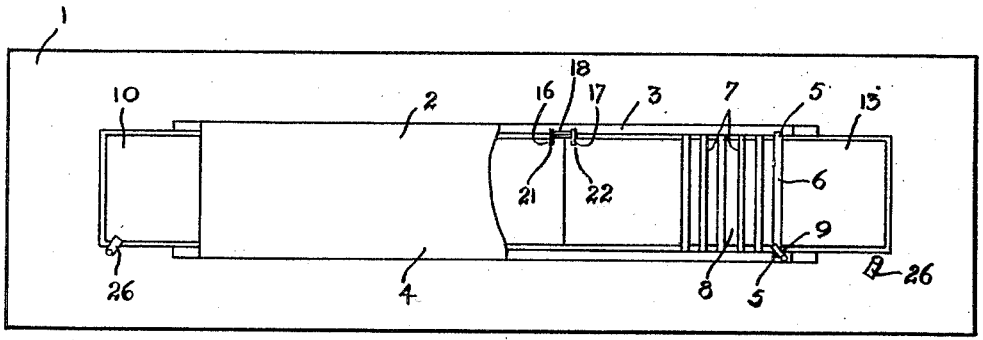
Fig. 2 is a plan view with part of the cover removed.

The numeral 1 indicates a platform which is adapted to rest on opposite edges of a pail of water or other suitable container, from which a rodent would be unable to escape, and upon which a passageway 2 is formed having side walls 3 and a cover 4. The side walls are grooved as at 5 for the purpose of receiving an end closure 6 which is preferably of glass so that the interior of the bait box can be plainly viewed. The numeral 7 indicates a plurality of wires extending between the side walls 3 to form a box 8 to which access is obtained by the withdrawal of the end closure 6 from the grooves 5, and 9 is a turnbutton which is adapted to engage one upper edge of the end closure to prevent its being upwardly moved. The numeral 10 indicates a runway which is mounted on a pivot pin 11 and is provided with a suitable weight 12 for the purpose of restoring it to a normal horizontal position after use.

Figure 3:
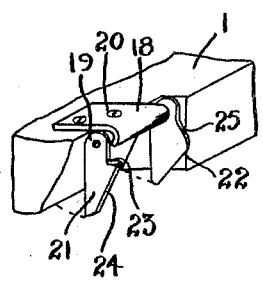
Fig. 3 is a detail view of the runway tripping mechanism.

The numeral 13 indicates a second runway which is mounted on a pivot pin 14 and is provided with a weight 15 at its outer end to restore it to normal position. The inner ends 16 and 17 respectively, of the runways 10 and 13, are adapted to be engaged by a latch 18, see Figure 3, which is formed with a pin 19 carried in a hinge plate 20 secured to the platform 1 and is provided at one end with a dog 21 and at the opposite end with a trigger 22. The inner end 16 of the runway 10 is adapted to rest normally upon the step 23 of the dog 21, and on returning to normal position after being tilted, to engage the sloping edge 24 thereof to swing the dog out of the perpendicular and to permit the inner end to become latched again in horizontal position. The inner end 17 of the second runway 13 is adapted to rest in contact with the upper slope 25 of the trigger 22 and as it descends with the superimposed weight of the rodent, it slides along the slope 25 pressing the trigger 22 and the dog 21 out of perpendicular, releasing the inner end 16 of the runway 10 therefrom, and permitting it to assume an inclined position simultaneously with the second runway 13, so that the rodent is caused to fall between the pair.

It is well known that rodents are very wary of new devices, therefore I provide turnbuttons 26 adjacent opposite ends of the platform 1, by which the runways can be secured in inoperative position, so that the rodents may familiarize themselves with the trap for any desired period of time, and thus lose that suspicion which renders them so difficult to catch, then by removing the turnbuttons from engagement with the runways, the rodents are readily caught.

What I claim as my invention is:

A rodent trap including a runway presenting a top wall and side walls made long enough to project slightly beyond one end of the top wall, the projecting portions of said side walls having their inner opposing surfaces recessed to provide vertical guide channels, a displaceable end wall slidably mounted in said guide channels and a series of spaced transversely extending rods connecting said side walls and arranged in a substantially L-shaped formation to extend inwardly in a substantially horizontal plane from the displaceable end wall and then upwardly toward the top wall to form a bait chamber to which access is obtained by displacing the end wall vertically.

Dated at Vancouver, B. C., this 11th day of December, 1925.

GUST HANSON.